(12) United States Patent
Kamay et al.

(10) Patent No.: US 8,467,631 B2
(45) Date of Patent: Jun. 18, 2013

(54) METHOD AND APPARATUS FOR IDENTIFICATION OF IMAGE UNIQUENESS

(75) Inventors: Yaniv Kamay, Modi' (IL); Arnon Gilboa, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 993 days.

(21) Appl. No.: 12/511,978

(22) Filed: Jul. 29, 2009

(65) Prior Publication Data

US 2010/0329572 A1 Dec. 30, 2010

Related U.S. Application Data

(60) Provisional application No. 61/222,058, filed on Jun. 30, 2009.

(51) Int. Cl.
*G06K 9/54* (2006.01)
*G06K 9/00* (2006.01)
*G06K 9/62* (2006.01)
*G06K 9/64* (2006.01)
*G06K 9/68* (2006.01)

(52) U.S. Cl.
USPC .......... 382/305; 382/100; 382/209; 382/217; 382/218

(58) Field of Classification Search
None
See application file for complete search history.

(56) References Cited

U.S. PATENT DOCUMENTS

| | | | |
|---|---|---|---|
| 7,421,128 B2 * | 9/2008 | Venkatesan et al. | 382/232 |
| 8,107,738 B2 * | 1/2012 | Ohira | 382/218 |
| 8,126,858 B1 * | 2/2012 | Ruzon et al. | 707/694 |
| 2004/0267740 A1 * | 12/2004 | Liu et al. | 707/3 |
| 2005/0132079 A1 * | 6/2005 | Iglesia et al. | 709/230 |
| 2006/0288006 A1 * | 12/2006 | Eschbach et al. | 707/6 |
| 2009/0204511 A1 * | 8/2009 | Tsang | 705/27 |

* cited by examiner

*Primary Examiner* — Tom Y Lu
*Assistant Examiner* — Thomas Conway
(74) *Attorney, Agent, or Firm* — Lowenstein Sandler LLP (57) ABSTRACT

A processor executing a display driver receives a new image object that has one or more identifiers. The processor makes a first determination as to whether the new image object matches one of a plurality of previously received image objects based on the one or more identifiers. If no match is found, the processor makes a second determination as to whether the new image object matches one of the plurality of previously received image objects based on comparing a hash of the new image object to hashes of the plurality of previously received image objects. If a matching previously received image object is found from either the first determination or the second determination, a reference to the matching previously received image object is sent to a client. If no matching previously received image object is found, the new image object is sent to the client.

21 Claims, 8 Drawing Sheets

| Translation Table | | | |
|---|---|---|---|
| Entry No. | Surface ID | Image ID | Hash |
| 01 | 01 | 01 | Value A |
| 02 | 02 | 01 | Value A |
| 03 | 03 | 01 | Value B |
| 04 | 54 | 01 | Value C |
| 05 | 72 | 01 | Value D |
| 06 | 11 | 01 | Value E |
| 07 | 13 | 01 | Value F |
| 08 | 15 | 01 | Value G |
| 09 | 15 | 02 | Value G |
| 10 | 15 | 03 | Value G |
| 11 | 72 | 02 | Value D |

| Hash Table | | | |
|---|---|---|---|
| Entry No. | Hash | Image Location | Reference Count |
| 01 | Value A | Location A | 2 |
| 02 | Value B | Null | 1 |
| 03 | Value C | Null | 1 |
| 04 | Value D | Location B | 2 |
| 05 | Value E | Null | 1 |
| 06 | Value F | Null | 1 |
| 07 | Value G | Location C | 3 |

METHOD AND APPARATUS FOR IDENTIFICATION OF IMAGE UNIQUENESS

RELATED APPLICATIONS

The present application claims priority to U.S. Provisional Patent Application No. 61/222,058 filed Jun. 30, 2009, and entitled, "Method and Apparatus for Identification of Image Uniqueness", which is hereby incorporated by reference herein in its entirety.

TECHNICAL FIELD

Embodiments of the present invention relate to transmitting images to remote clients, and more specifically to identifying and caching images at the remote client.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute guest software, including operating systems known as guest operating systems. The VMM virtualizes the underlying hardware of the host machine or emulates hardware devices, making the use of the VM transparent to the guest operating system or the remote client that uses the VM.

Most operating systems are not optimized for use in a virtual machine. This lack of optimization manifests itself, among other instances, when the virtual machine provides images to a display at a remote client. Because operating systems typically send images to a local display via a low latency high bandwidth path, little attention is paid to repeated images sent to the display. However, when a remote display system (RDS) sends multiple identical images to a remote display of a client, considerable slowdown can occur, as well as an increase in bandwidth usage.

An example of an operating system that is not optimized for use in a virtual machine is the Windows® operating system manufactured by Microsoft®, Inc. The Windows operating system uses a graphics device interface (GDI) to generate images for a display, printer, plotter or bitmap file in memory. Each image is assigned to a particular surface, and is given a unique image identifier within that surface. Ideally, the same image would always have the same surface ID and image ID. However, this is not the case. The GDI frequently assigns different image IDs and/or surface IDs to identical images or does not assign image IDs or surface IDs at all. This behavior results in multiple redundant images being sent to the client, consuming unnecessary resources. Therefore, the GDI mechanism cannot be relied upon to identify whether a current image matches any previously transmitted images.

Some operating systems include a feature that recommends whether or not to cache image objects. However, the accuracy of this feature may not be reliable. For example, the GDI of Windows often suggests that an image be cached, even though the image is never encountered again and may waste a considerable amount of cache space. Likewise, the GDI also suggests that image objects should not be cached for image objects that will be repeated hundreds or thousands of times. Therefore, the GDI mechanism also cannot be relied upon for making image caching decisions.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for a multi-phase technique for determining image uniqueness. In one embodiment, a processor executing a graphics device driver receives a new image object that has one or more unique identifiers. The graphics device driver determines whether the new image object matches any previously received image objects based on the one or more identifiers. If no match is found, the graphics device driver generates a hash of the new image object. The graphics device driver then determines whether the new image object matches any of the previously received image objects based on comparing the hash of the new image object to hashes of the previously received image objects. If a matching previously received image object is found, the graphics device driver sends a reference for the matching previously received image object to a client via a remote display system. In one embodiment, the reference is a uniqueness ID that is generated by the device driver for uniquely identifying the image. If no matching previously received image object is found, the graphics device driver may send the new image object to the client via the remote display system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "receiving", "making", "determining", "sending", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Figure 1A:
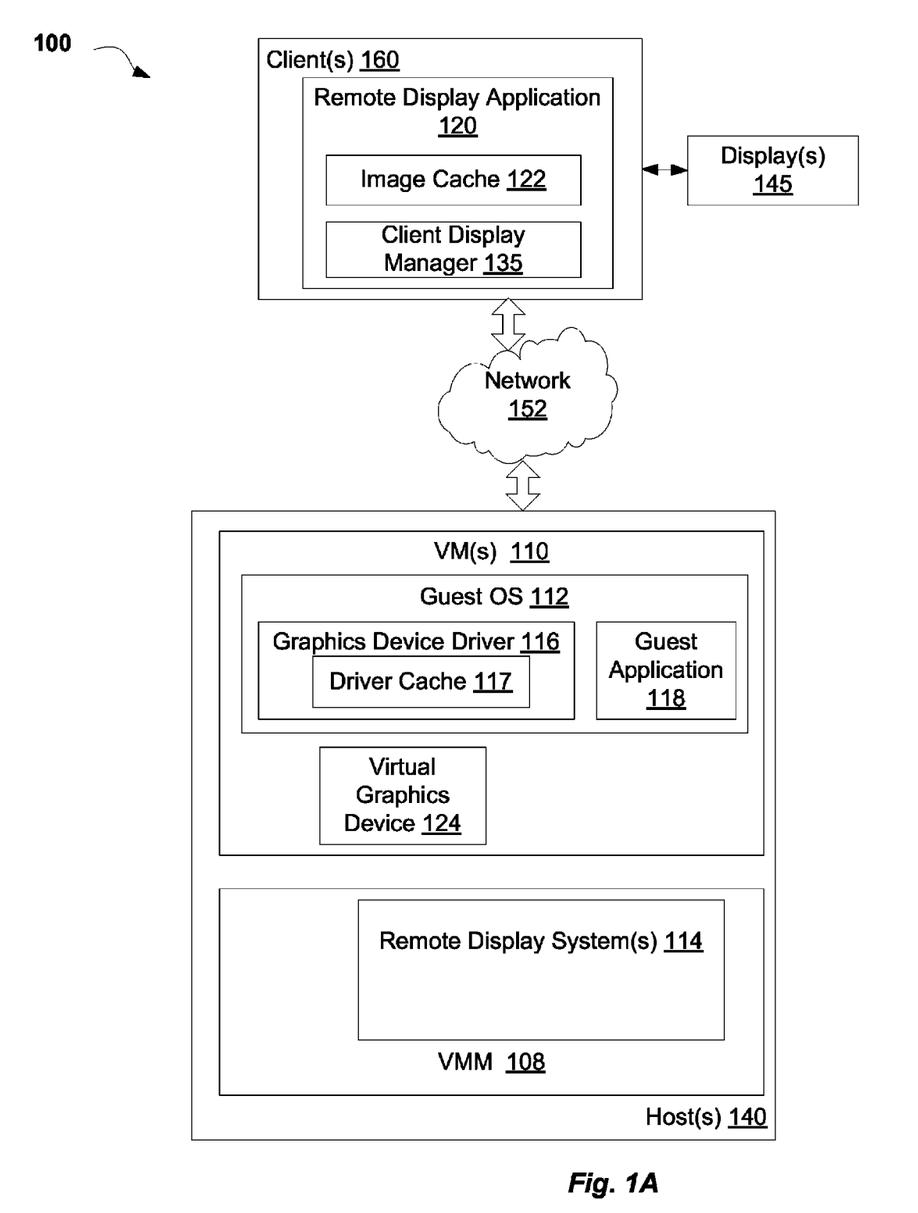
FIG. 1A is a block diagram of a virtualization system, in which embodiments of the invention may operate.

FIG. 1A is a block diagram of virtualization system 100, in which embodiments of the invention may operate. The virtualization system 100 includes, but is not limited to, one or more clients 160 communicatively coupled to one or more hosts 140 or a cluster of hosts 140 over a network 152. Network 152 may be a private network (e.g., a local area network (LAN), a wide area network (WAN), etc.) or a public network (e.g., the Internet), and may be a combination of one or more networks.

Each host 140 is a server configured to host one or more virtual machines (VM) 110. The host 140 includes a bare platform hardware that may be a personal computer (PC), server computer, mainframe, or other computing system. The platform hardware can include a processor, memory, input/output devices, etc.

Each host 140 includes a virtual machine monitor (VMM) 108 (also known as a hypervisor). The VMM 108, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The VMM 108 presents to the higher level software (commonly referred to as "guest" software) the abstraction of one or more virtual machines (VMs) 110. The VMM 108 may provide the same or different abstractions to various guest software (e.g., guest operating system, guest applications, etc.).

In one embodiment, the VMM 108 is run directly on bare platform hardware. In another embodiment, the VMM 108 is run on top of a host OS (e.g., as a kernel module of a host OS). Alternatively, for example, the VMM 108 may be run within, or on top of, another VMM. VMMs 108 may be implemented, for example, in hardware, software, firmware or by a combination of various techniques.

Virtual machines 110 can be, for example, hardware emulation, full virtualization, para-virtualization, and operating system-level virtualization virtual machines. Each virtual machine 110 includes a guest operating system (guest OS) that hosts one or more applications within the virtual machine. The guest OSes 112 running on the virtual machines 110 can be of the same or different types (e.g., two guest OSes may both be Windows operating systems, or one may be a Windows operating system and the other a Linux operating system). Moreover, the guest OSes 112 and the host OS may share the same operating system type, or the host OS may be a different type of OS than one or more guest OSes 112. For example, a guest OS may be a Windows operating system from Microsoft and a host OS may be a Linux operating system available from Red Hat.

In one embodiment, users access virtual machines 110 remotely via clients 160. In another embodiment, users access virtual machines 110 via input/output (I/O) devices (not shown) that are connected directly to the host or cluster of hosts 140. Each VM 110 may communicate with one or more clients 160 and/or one or more applications running on those clients 160. Additionally, a single client 160 may communicate with multiple virtual machines 110. For example, each application running on a client 160 may communicate with different VMs. Alternatively, all of the applications of a client 160 may communicate with a single VM. In one embodiment, the VM 110 communicates with a remote display application 120 running on the client 160 using a remote access protocol (e.g., Remote Desktop Protocol (RDP), Simple Protocol for Independent Computing Environments (SPICE™ from Red Hat), etc.) that allows for display connection between the host 140 and the client 160.

Each client 160 may be a personal computer (PC), palm-sized computing device, personal digital assistant (PDA), etc. Clients 160 may be fat clients (clients that perform local processing and data storage), thin clients (clients that perform minimal or no local processing and minimal to no data storage), and/or hybrid clients (clients that perform local processing but little to no data storage). In one embodiment, clients 160 essentially act as input/output devices, in which a user can view a desktop environment provided by a virtual machine (e.g., a running instance of an operating system including storage available to the operating system and programs installed and/or running on the operating system) on a monitor, and interact with the desktop environment via a keyboard, mouse, microphone, etc. In one embodiment, a majority of processing is not performed at the clients 160, and is instead performed by virtual machines 110 hosted by the host 140.

Each client 160 is communicatively coupled to one or more displays 145 that present graphics data (e.g., image objects) received from a virtual machine 110. The display 145 can be a display monitor, a window on a monitor screen, or any other entity that can receive graphic input and/or graphic commands.

A guest application 118 and/or guest OS 112 running within the VM 160 may generate outputs (e.g., images) to be displayed at display 145 of client 160. These outputs may be generated in response to data received from the client (e.g., an input received from a keyboard or mouse of client 160). Graphics data associated with the virtual machine 110 can be captured and transmitted to client 160 (e.g., in the form of commands and/or image objects), where the graphics data may be rendered and/or presented by a remote display application 120.

The remote display application 120 is a client side application that is configured to receive data from the virtual machine 110 and present it at the display 145. In one embodiment, the remote display application 120 is a thin application such as a browser. In one embodiment, the remote display application 120 maintains an image cache 122 of graphics data that has been received from the remote display system 114. Remote display application 120 may maintain the image cache 122 in accordance with instructions received from the RDS 114. Rather than sending the same image to client 160 each time the image is to be displayed, the VM 110 may send a reference to a previously sent image that is stored in the image cache 122. This reduces resource utilization at both the client 160 and host 140, and minimizes bandwidth usage.

In one embodiment, the remote display application 120 of client 160 includes a client display manager 135 that forwards data to, and receives responses from, client display 145. In one embodiment, the client display manager 135 is responsible for establishing connections with a virtual graphics device 124 that resides in the VM 110. In one embodiment, the client display manager 135 establishes a connection with virtual graphics device 124 using the IP address and port of the virtual graphics device 124.

Once graphics data (e.g., an image object) has been generated by the guest application 118 or guest OS 112, it may be sent to a graphics device driver 116 that resides in the guest OS 112. The graphics device driver 116 enables the guest applications 118 and guest OS 112 to interact with a graphics device. In one embodiment, the graphics device driver 116 interacts with a virtual graphics device 124 that resides in the VM 110. Alternatively, the graphics device driver 116 may interact with a hardware graphics device. The graphics device driver sends the graphics data (e.g., image objects) and/or one or more commands associated with the graphics data to the virtual graphics device (or physical graphics device) for processing.

The virtual graphics device 124 emulates a physical display card (e.g., a PCI, AGP or PCI express display card) that may or may not be a hardware component of host 140. For example, virtual graphics device 124 may emulate graphic verbs such as drawing lines, ellipses, fill areas, display images, etc. In addition, the virtual graphics device 124 may emulate 3D verbs, such as drawing cubes, rotating a shape, etc. and may also provide video streaming verbs. In some embodiments, the virtual graphics device 124 uses bare platform hardware of the host 140 to accelerate some functions. Virtual graphics device 124 performs one or more operations to allow for rendering and/or presentation of graphics data (e.g., image objects) at display 145 of client 160.

In one embodiment, the host 140 includes a remote display system (RDS) 114 for each VM 110. The RDS 114 may be part of the VMM 108 (as illustrated), part of a hardware emulation layer, or run on top of the VMM 108. The RDS 114 connects with the remote display application 120 over the network, and enables virtual graphics device 124 and/or graphics device driver 116 to display images on display 145. During an active display connection, the RDS 114 may receive data (e.g., graphics commands) from the virtual graphics device 124 and/or graphics device driver 116.

Alternatively, a process may hook into relevant system services, and may intercept system calls and/or library calls. The process may then redirect those system calls/library calls to the RDS 114. For example, the process may hook all GDI calls so that it appears to the guest application 118 that it is calling a standard GDI, when in fact all calls are being directed to the RDS 114. This enables the RDS 114 to display specific applications instead of an entire desktop on the remote client 160.

RDS 114 communicates received graphics data (e.g., as received from a process, virtual graphics device 124 or graphics device driver 116) to remote display application 120. In some embodiments, the RDS 114 performs additional processing (e.g., compression, encryption, streaming, image uniqueness identification, etc.) of the data received from the virtual graphics device 124 and/or graphics device driver 116 prior to communicating it to the client display manager 135.

In one embodiment, the graphics device driver 116 includes a driver cache 117 of previously received image objects. The graphics device driver 116 compares received image objects to previously received image objects that are stored in the driver cache 117. In one embodiment, the graphics device driver 116 compares the received image object to stored image objects using a multi-phase technique for testing image uniqueness. Alternatively, the graphics device driver 116 may compare the received image object to stored image objects using a single-phase technique for determining image uniqueness.

If the device driver 116 identifies a cache hit (a match between a new image object and a stored image object), it may notify the remote display system 114 of the cache hit. Alternatively, the device driver 116 may send a cache hint to the RDS 114, from which the RDS 114 may infer that there is a cache hit. In one embodiment, cache hits are tracked using a reference count. If there is no cache hit, then the graphics device driver 116 may generate a uniqueness identifier for the image object, and send the uniqueness identifier and the image object to the remote display system 114. Additionally, the graphics device driver 116 may generate a uniqueness ID for the image object if there is a hit as well.

Whenever RDS 114 receives a new image object with a uniqueness ID, it may send the new image object with its uniqueness ID to the remote display application 120 along with instructions to store the image in the image cache 122. The RDS 114 may also receive a cache hint along with the image object. The cache hint helps RDS 114 determine whether to instruct remote display application 120 to cache the image. If RDS 114 receives an image object with a uniqueness ID that exists in image cache 122, the RDS 114 may cause the remote display application 120 to display the image object from image cache 122.

In one embodiment, each virtual machine 110 hosts or maintains a desktop environment providing virtual desktops for remote clients (e.g., client 160). A virtual desktop is a virtualized desktop computer, and thus may include storage, an operating system, applications installed on the operating system (e.g., word processing applications, spreadsheet applications, email applications, etc), and so on. In one embodiment, in which the VM 110 provides a virtual desktop, graphics data associated with the virtual desktop can be captured, and the virtual desktop can then be rendered and presented at the client 160. In other embodiments, virtual machines 110 do not provide virtual desktops.

Note that though the multi-phase technique for determining image uniqueness is described above as being performed in one embodiment by the graphics device driver 116 and in another embodiment by the remote display system 114, the technique may also be performed by the virtual graphics device 124. Alternatively, the multi-phase image uniqueness identification may be performed by multiple components, including some or all of the graphics device driver 116, virtual graphics device 124 and remote display system 114. Additionally, a single phase image uniqueness identification may also be performed.

Figure 1B:
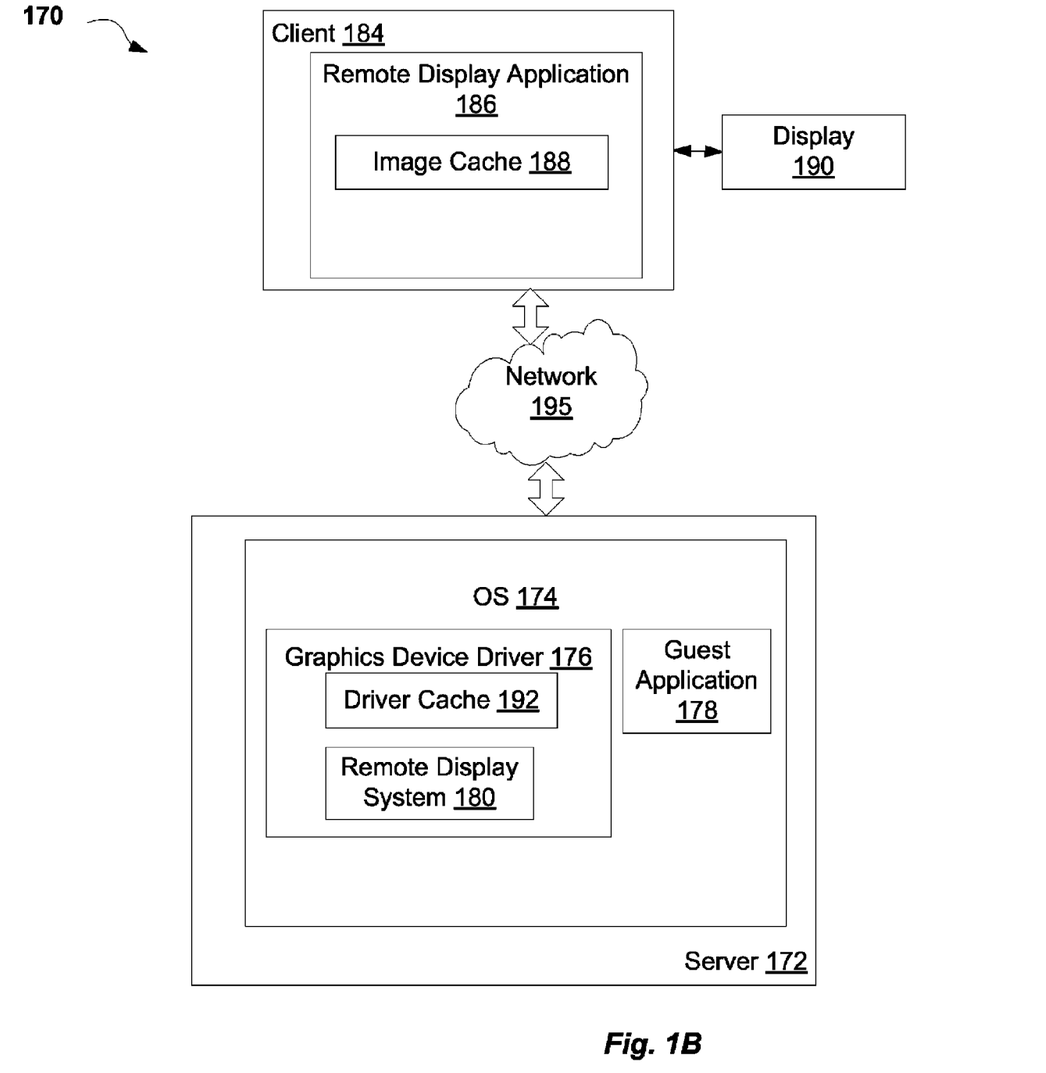
FIG. 1B is a block diagram of a standard computing system, in which embodiments of the invention may operate.

FIG. 1B is a block diagram of a computing system 170, in accordance with one embodiment of the present invention. The computing system 170 includes a server 172 connected to a client 184 via a network 195, which may be a public or private network.

The server 172 includes an operating system 174 (e.g., Windows OS, Linux OS, etc.). On the OS 174 is installed a graphics device driver 176 and a guest application 178. In one embodiment, the graphics device driver 176 is a virtual display driver. The guest application 178 may send graphics data (e.g., image objects) to the graphics device driver 176, or a process may intercept graphics data directed to a graphics device interface of the OS 174.

In one embodiment, the graphics device driver 176 compares information on the image objects to previously received image objects that are stored in an image cache 188 on the client 184. This comparison may be performed using a data structure that includes information the image objects stored in the image cache 188. If the image object matches a previously received image object stored in the image cache 188, then the graphics device driver 176 may send a reference to the cached image object (e.g., a unique image identifier for the image object) to client 184. If no match is found, the graphics device driver 176 may send the image object to the client 184.

In one embodiment, the graphics device driver 176 includes a remote display system 180 that enables the graphics device driver 176 to manage the image cache 188, generate uniqueness IDs and/or send new image objects or references to the stored image objects to the client 184. The remote display system 180 communicates with a remote display application 186 that runs on client 184 to enable graphics device driver 176 to display images on a remote display 190 of client 184.

The remote display system 180 maintains the image cache 188 at the client 184. When the remote display application 186 receives a new image object, it may also receive instructions from the RDS 180 to add the new image object to the image cache 188. When the remote display application 186 receives a reference to a cached image object, remote display application 186 uses the reference to retrieve the image object from the cache 188 for displaying on display 190. Remote display application 186 may also periodically receive instructions from RDS 180 to remove entries from the image cache (e.g., as the image cache 188 fills up).

In an alternative embodiment, the remote display system 180 may be a separate module from the graphics device driver 176. As a separate module, the RDS 180 may perform one or more of the functions of the graphics device driver 176. For example, the remote display system 180 may compare new image objects to previously received image objects to determine whether the new image objects have been received before and/or may generate uniqueness IDs and/or hashes for image objects.

Figure 2A:
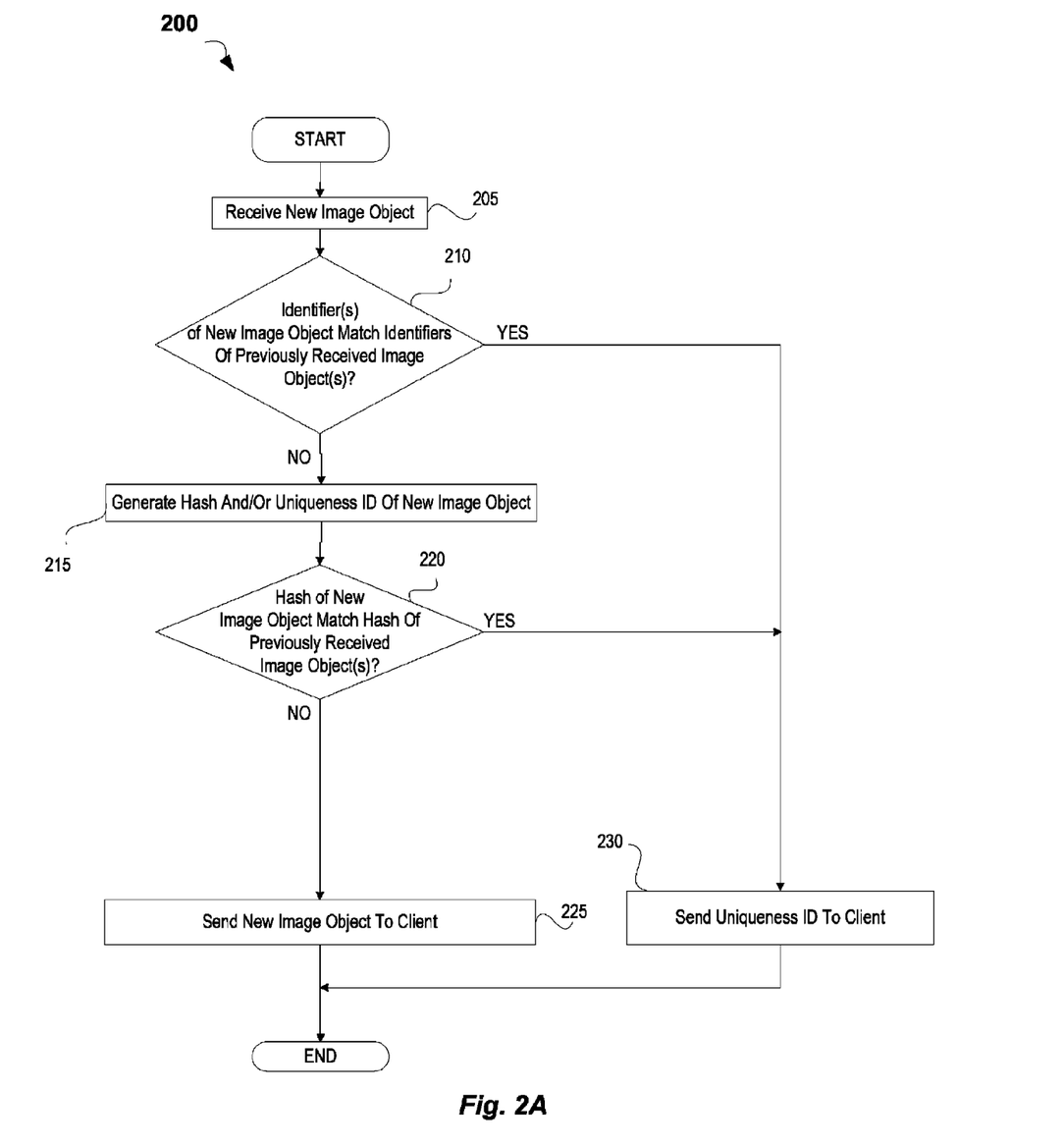
FIG. 2A is a flow diagram illustrating a method for one embodiment of performing a multi-phase technique for determining image uniqueness.

FIG. 2A is a flow diagram illustrating a method 200 for one embodiment of performing a multi-phase technique for determining image uniqueness. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by host machine 140 of FIG. 1. In another embodiment, method 200 is performed by one or more of a remote display system 114, virtual graphics device 124 and graphics device driver 116. Work may be divided between these components in numerous ways, some of which are discussed herein. However, it should be understood that other ways of dividing tasks between these components are also possible.

Referring to FIG. 2A, at block 205 processing logic receives a new image object. The new image object may be received from a guest application by a graphics device driver that runs on the host. In one embodiment, the new image object is a bitmap object. A bitmap object is an object used to work with images defined by pixel data. A bitmap object includes pixel data for a graphics image and its attributes (properties). The attributes may include height and width (e.g., horizontal and vertical resolution), palette, depth, etc.

Each image object includes one or more system assigned identifiers. In one embodiment, each image object is associated with a specific surface via a surface handle or surface ID. In one embodiment, each image object is further associated with an image identification value (referred to herein as an image ID). The image identification value identifies a current state of the specified surface, identifying an image within the surface. Therefore, if two image objects have the same surface ID and the same image ID, it can be determined that those two image objects are the same. As the image displayed within a surface changes, each new image is assigned a new image identifier. Ideally, as an image is refreshed, if the image within a particular surface has not changed, then the image object will have the same image ID and the same surface ID. However, conventional operating systems (e.g., the Windows operating system) do not always assign the same surface ID and image ID to unchanging or repeat image objects.

At block 210, processing logic determines whether the identifiers (e.g., the surface ID and the image ID) associated with the received image object match identifiers of previously received image objects in a first image uniqueness verification phase. If the identifiers do match those of a previously received image object, the method continues to block 230. If the identifiers do not match those of a previously received image object, the method continues to block 215. In one embodiment, the first image uniqueness verification phase is not performed. Instead, method 200 may continue from block 205 directly to block 215. This may be the case, for example, for systems that do not have a preexisting mechanism for identifying new images.

At block 215, processing logic generates a hash and/or a uniqueness ID of the new image object. The hash may be generated, for example, using the message-digest algorithm 5 (MD5) hash function, Jenkins hash function, MurmurHash, Pearson Hashing, or other hash functions. The uniqueness ID may simply be the hash, or may be a separate value based on the hash and/or on one or more attributes of the image object. The uniqueness ID is a different identifier from the system generated identifiers that may already be associated with the new image object (e.g., the surface ID and the image ID).

At block 220, processing logic compares the hash of the new image object to previously generated hashes of previously received image objects in a second image uniqueness verification phase. Processing logic may also compare the uniqueness ID to previously generated uniqueness IDs instead of, or in addition to, comparing hashes. If a match is found, then the method continues to block 230. If no match is found, the method continues to block 225.

At block 225, the new image object is sent to a client so that it can be displayed/printed on the appropriate surface. In one embodiment, the new image object is compressed before it is sent to the client. The new image object is then decompressed at the client upon receipt.

At block 230, the processing logic sends the uniqueness ID and/or the hash for the matching previously received image object to a client via a remote display system. The client may then display/print the image object in a display, printer, etc. using a cached copy of the previously received image object.

Figure 2B:
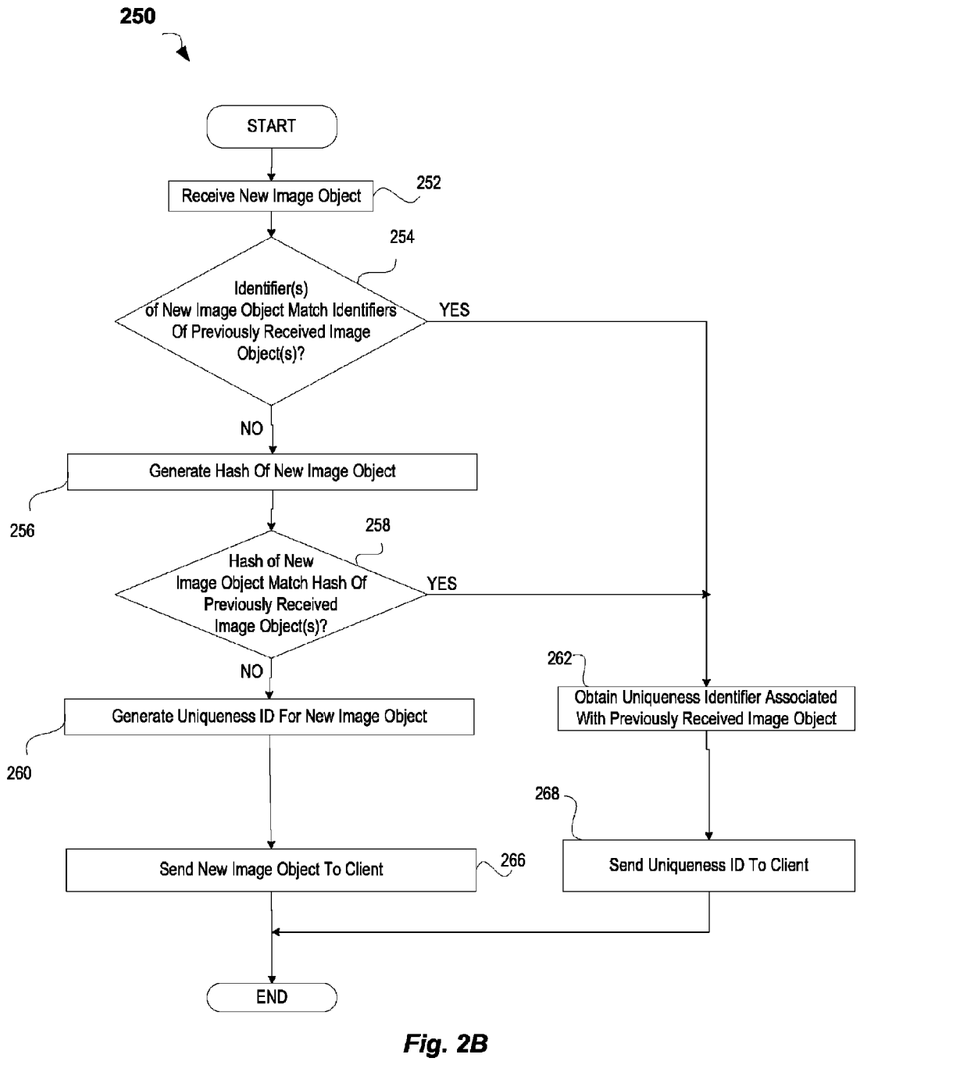
FIG. 2B is a flow diagram illustrating a method for one embodiment of performing a multi-phase technique for determining image uniqueness that is a variation of the method illustrated in FIG. 2A.

FIG. 2B is a flow diagram illustrating a method 250 for one embodiment of performing a multi-phase technique for determining image uniqueness that is a variation of method 200. Method 250 may be performed by processing logic that may comprise hardware (e.g., circuitry, dedicated logic, programmable logic, microcode, etc.), software (such as instructions run on a processing device), or a combination thereof. In one embodiment, method 250 is performed by host machine 140 of FIG. 1. In another embodiment, method 250 is performed by one or more of a remote display system 114, virtual graphics device 124 and graphics device driver 116. Work may be divided between these components in numerous ways, some of which are discussed herein. However, it should be understood that other ways of dividing tasks between these components are also possible.

Referring to FIG. 2B, at block 252 processing logic receives a new image object. Each image object includes one or more system assigned identifiers, which may include a surface ID and an image ID. At block 254, processing logic determines whether the identifiers (e.g., the surface ID and the image ID) associated with the received image object match identifiers of previously received image objects in a first image uniqueness verification phase. If the identifiers do match those of a previously received image object, the method continues to block 262. If the identifiers do not match those of a previously received image object, the method continues to block 256.

At block 256, processing logic generates a hash of the new image object. At block 258, processing logic compares the hash of the new image object to previously generated hashes of previously received image objects in a second image uniqueness verification phase. If the new hash matches any of the previously generated hashes, then the method continues to block 262. If no match is found, the method continues to block 266.

At block 260, processing logic generates a uniqueness ID for the new image object. The uniqueness ID may simply be the hash, or may be a separate value based on the hash and/or on one or more attributes of the image object. The uniqueness ID is a different identifier from the system generated identifiers that may already be associated with the new image object (e.g., the surface ID and the image ID).

At block 266, processing logic sends the new image object to a client so that it can be displayed/printed on the appropriate surface. In one embodiment, the new image object is sent to the client along with the uniqueness ID. In one embodiment, the new image object is compressed before it is sent to the client. The new image object is then decompressed at the client upon receipt.

At block 262, processing logic obtains a uniqueness ID associated with the previously received object.

At block 268, the processing logic sends the uniqueness ID for the matching previously received image object to a client via a remote display system. The client may then display/print the image object in a display, printer, etc. using a cached copy of the previously received image object.

Figure 3A:
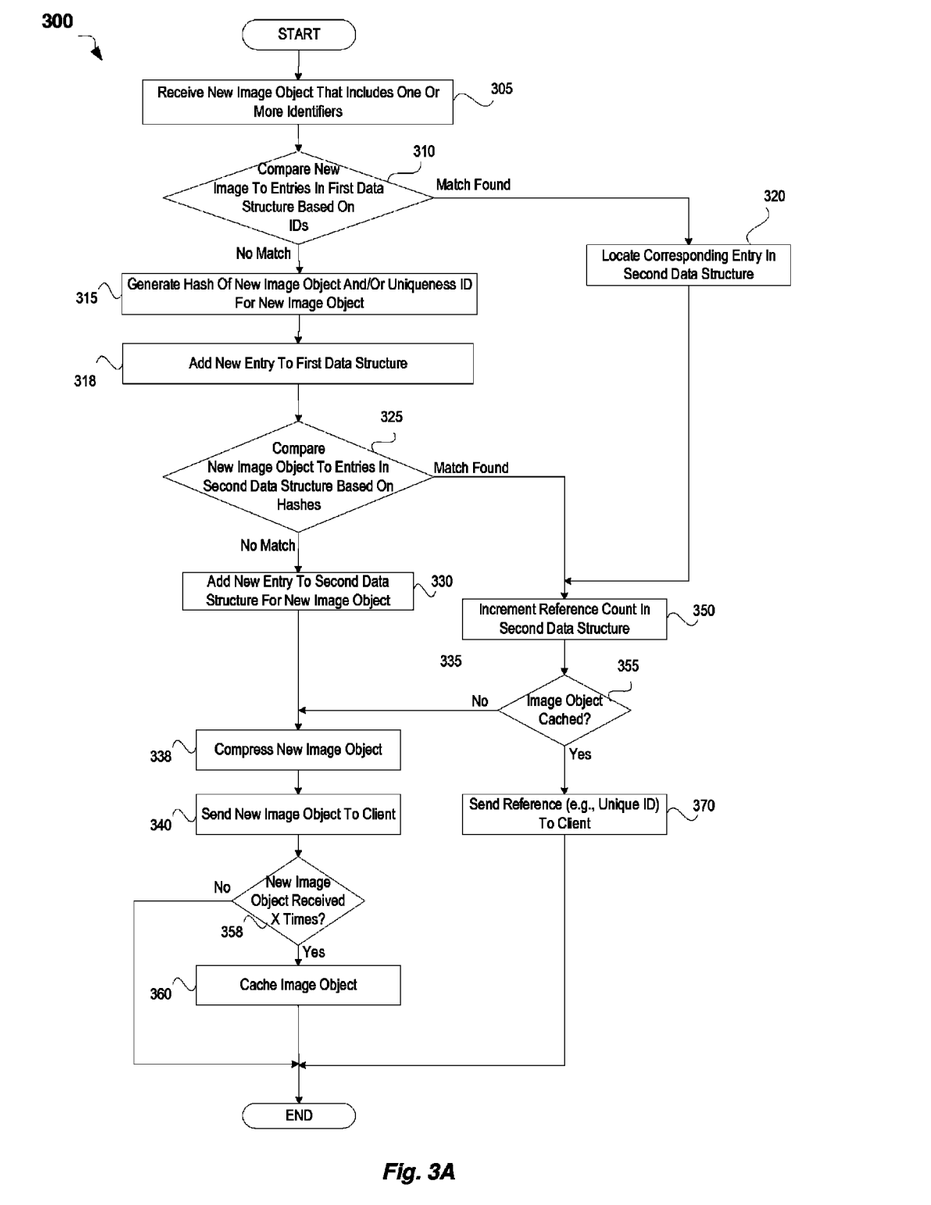
FIG. 3A is a flow diagram illustrating a method for another embodiment of performing a multi-phase technique for determining image uniqueness.

FIG. 3A is a flow diagram illustrating a method 300 for another embodiment of performing a multi-phase technique for determining image uniqueness. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by host machine 140 of FIG. 1. In another embodiment, method 300 is performed by one or more of a remote display system 114, virtual graphics device 124 and graphics device driver 116.

Referring to FIG. 3A, at block 305 processing logic receives a new image object. The new image object may be received from a guest application by a graphics device driver that runs on a guest OS. In one embodiment, the new image object is a bitmap object. Each image object includes one or more identifiers. In one embodiment, the identifiers include a surface ID and an image ID.

At block 310, processing logic determines whether the identifiers (e.g., the surface ID and the image ID) associated with the received image object match identifiers of previously received image objects. In one embodiment, this determination is made in a first image uniqueness verification phase by comparing the identifiers of the new image object to identifiers of previously received image objects using a first data structure. In one embodiment, the first data structure is a translation table that translates the identifiers to entries in an image uniqueness hash table. If a match is found in the first data structure, then the method proceeds to block 320. If no match is found, the method continues to block 315.

At block 315, processing logic generates a hash of the new image object. The hash function is preferably a high performance hash function that will produce few collisions. In one embodiment, the hash function is a 32-bit or 64-bit hash function. The hash may be generated, for example, using the message-digest algorithm 5 (MD5) hash function, Jenkins hash function, MurmurHash, Pearson Hashing, or other hash functions. At block 315 processing logic may also generate a uniqueness ID of the new image object. The uniqueness IDs may be used by the processing logic to differentiate between varying images. In one embodiment, the uniqueness ID is based on the hash value and on properties of the image object. Inage properties may include, for example, image height, width, depth, etc.

At block 318, processing logic adds a new entry to the first data structure for the new image object. The new entry may include the identifiers associated with the new image object (e.g., a surface ID and an image uniqueness ID). The new entry may also include other fields, such as a hash value of the new image object and/or a uniqueness ID of the new image object. The method then continues to block 325.

At block 325, processing logic compares the hash of the new image object to previously generated hashes of previously received image objects in a second phase of the image uniqueness verification. The hash of the new object is compared to hashes of previously received objects using an image uniqueness hash table. If the new hash matches any of the previously generated hashes, then the method continues to block 350. If no match is found, the method continues to block 330. In one embodiment, processing logic compares a uniqueness ID of the new image object to uniqueness IDs of cached image objects instead of, or in addition to, comparing hashes. If the uniqueness ID of the image object does not match any stored uniqueness ID, the method proceeds to block 330 even if the hashes do match. If a matching uniqueness ID is found, the method continues to block 350.

At block 330, a new entry is added to the second data structure for the new image object. The new entry may include the hash and/or the uniqueness ID for the image object. The new entry may also include a reference count representing the number of times the image associated with the image object has been displayed. Other fields may also be included in the new entry. In one embodiment, processing logic adds a reference to the newly added image in the second data structure. The reference may be the uniqueness ID associated with the image object or another value. Therefore, when the image object is encountered in the future, rather than sending the image object to the client, a reference (e.g., the uniqueness ID) can be sent to the client that the client uses to locate the image object in the image cache.

At block 350, processing logic increments a reference count for the associated entry in the second data structure. The reference count keeps track of the number of times a particular image has been displayed (e.g., the number of times that image objects that have matched the stored image object of the entry).

At block 355, processing logic determines whether the image object has been cached in an image cache. If the image object is not cached, the method proceeds to block 338. If the image object is cached, the method proceeds to block 370. At block 370, processing logic sends a reference to the image to the client (e.g., via a remote display system). The reference may be the uniqueness ID of the image object.

In one embodiment, at block 338, processing logic compresses the new image object. The image object may be compressed, for example, by the remote display system, the virtual graphics device or the graphics device driver. At block 340, the remote display system sends the compressed image object to a client. The client may then decompress and display/print the image object.

Method 300 is capable of identifying image objects that do not need to be cached. At block 358, the processing logic determines whether the image has been received a predetermined (X) number of times (e.g., once, twice, five times, etc.). In one embodiment, images are not cached until they have been received the predefined number of times. For example, images may not be cached the first time that they are received. This prevents the image cache from filling up with images that will only ever be received once. Such images may include, for example, frames from a streamed video. At block 358, if the image object has been received the predetermined number of times (e.g., 2 times), then the method continues to block 360. Otherwise, the method ends.

At block 360, processing logic caches the new image object. The new image object may be cached at both the graphics device driver and at the client. The image object may be cached at the client, and information about the client's cache may be maintained by the RDS. Methods 200 and 300 save network bandwidth between a host and a client. These methods can also reduce the amount of memory used to cache images at the client and/or host. Moreover, methods 200 and 300 reduce system resource utilization (e.g., of CPU resources) at the host by minimizing the number of images to compress and at the client by reducing the number of images to decompress. The reduction in system resource utilization in the host may enable the host to host more virtual machines. Methods 200 and 300 may also improve an end user experience by reducing latency (e.g., on a WAN).

Figure 3B:
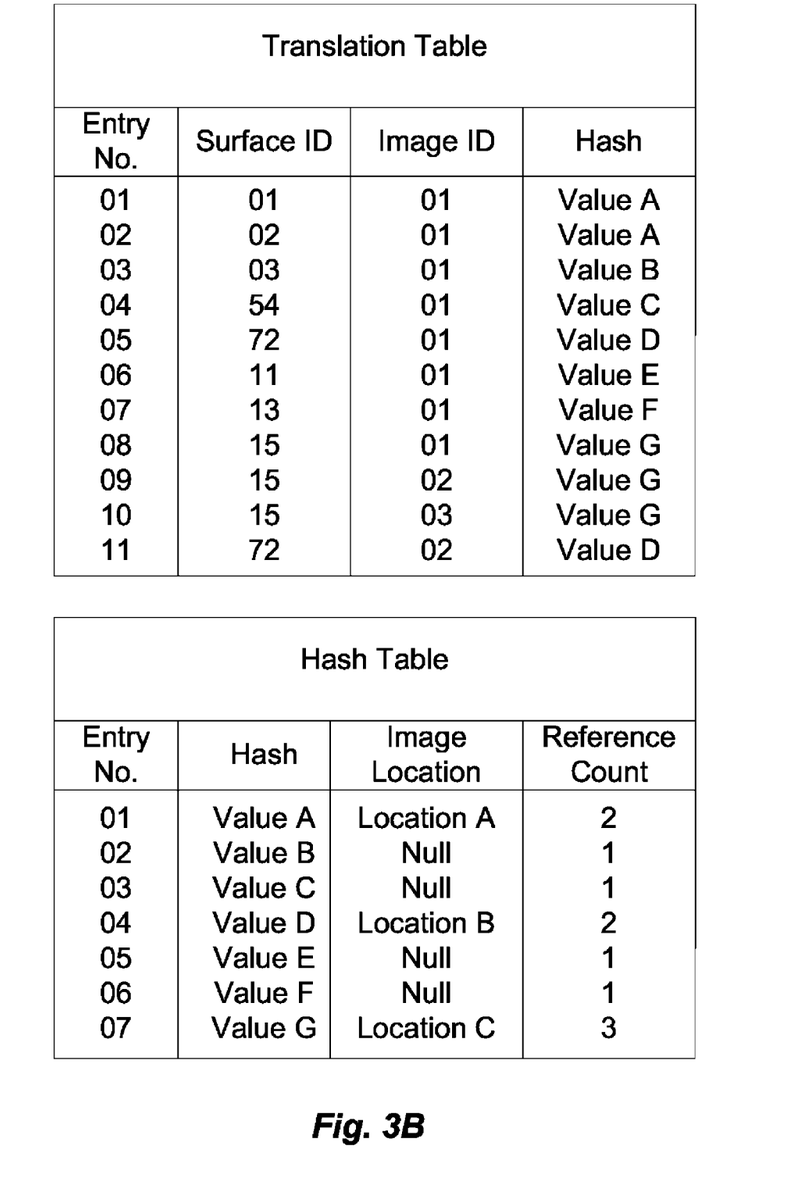
FIG. 3B illustrates an example translation table and hash table.

FIG. 3B illustrates an example translation table and hash table that may be used for performing method 300 of FIG. 3A. In one embodiment, the translation table corresponds to the first data structure of method 300, and the hash table corresponds to the second data structure of method 300.

Each entry in the translation table represents an identifier or group of identifiers for images. Each time a new image object having a new identifier is received, an entry for that image object is added to the translation table. As illustrated, each entry in the translation table includes a surface ID and an image ID. In other embodiments, other identifiers may be used in addition to, or instead of, the surface ID and image ID. Each entry in the translation table also includes a hash that can be used to locate a corresponding entry of a unique image in the hash table.

Each entry in the hash table represents a unique image. A single image may be associated with different image identifiers. However, hashes of the image will be the same regardless of the image identifiers associated with it. In one embodiment, there is a separate entry in the hash table for each new image that is received. As illustrated, the hash table includes a hash value and a location in the cache for each entry. The image location is a reference to a location in an image cache where the image is stored. If the image associated with an entry in the hash table has not been stored in the image cache, then the image location may include a null value.

In one embodiment, the hash table includes a uniqueness ID field. Alternatively, the hash table may include both the hash value and the uniqueness ID fields. The hash value and/or the uniqueness ID may also be used to locate the image in a cache where the image is stored.

As the hash table and translation table fill up, entries need to be removed from the tables. In one embodiment, the least recently used images are removed from the tables as necessary to make room for new entries. Alternatively, other schemes for table management may be used, such as first in, first out (FIFO), removing entries after they have not been referenced for a predetermined time period, etc.

In one embodiment, each entry further includes a reference count. The reference count identifies the number of times a particular image has been used. In one embodiment, entries with higher reference counts are removed from the hash table more slowly. For example, different criteria may be used for removing entries with reference counts that exceed a predetermined value than for other entries.

In one embodiment, in which only a single-phase image uniqueness verification technique is used, the translation table is unnecessary.

Figure 4:
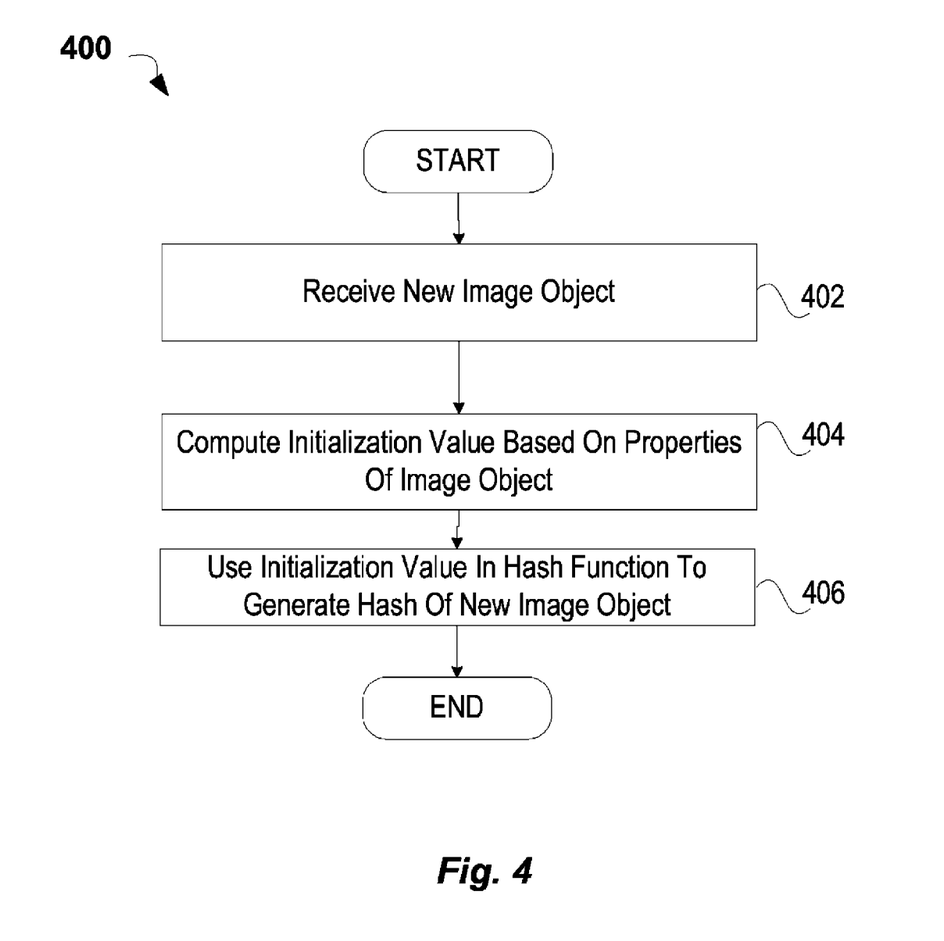
FIG. 4 is a flow diagram illustrating a method for an embodiment of generating a hash of an image object.

FIG. 4 is a flow diagram illustrating a method 400 for an embodiment of generating a hash and/or a uniqueness ID of an image object. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by host machine 140 of FIG. 1. In one embodiment, method 400 is performed at block 215 of FIG. 2. In another embodiment, method 400 is performed at block 315 of FIG. 3.

Referring to FIG. 4, at block 402 processing logic receives a new image object. At block 404, processing logic computes an initialization value based on properties of the image object. The initialization value is a block of bits that is used as a starting value for generating a hash. The initialization value differentiates images, and thus reduces the chance of collision of the hashes. In one embodiment, the initialization value is generated from a height, width and/or depth of the received image object. Alternatively, other image properties may be used.

At block 406, the initialization value is used in a hash function to generate a hash of the new image object. A hash function typically uses three parameters for generating a hash: a pointer to the data from which to generate the hash, a length of the data, and an initialization value. Many conventional hash functions often use an initialization value of zero. However, in one embodiment, an initialization value that is specific to a particular image is used to further differentiate image hashes. The hash function may be the MD5 hash function, Jenkins hash function, etc. Upon generating the hash, the method ends.

In one embodiment, the hash value is used as a uniqueness ID. Alternatively, a uniqueness ID may be generated from the hash value using a uniqueness ID generating function at block 406. The uniqueness ID may be based on the hash and the image properties of the new image object.

Figure 5:
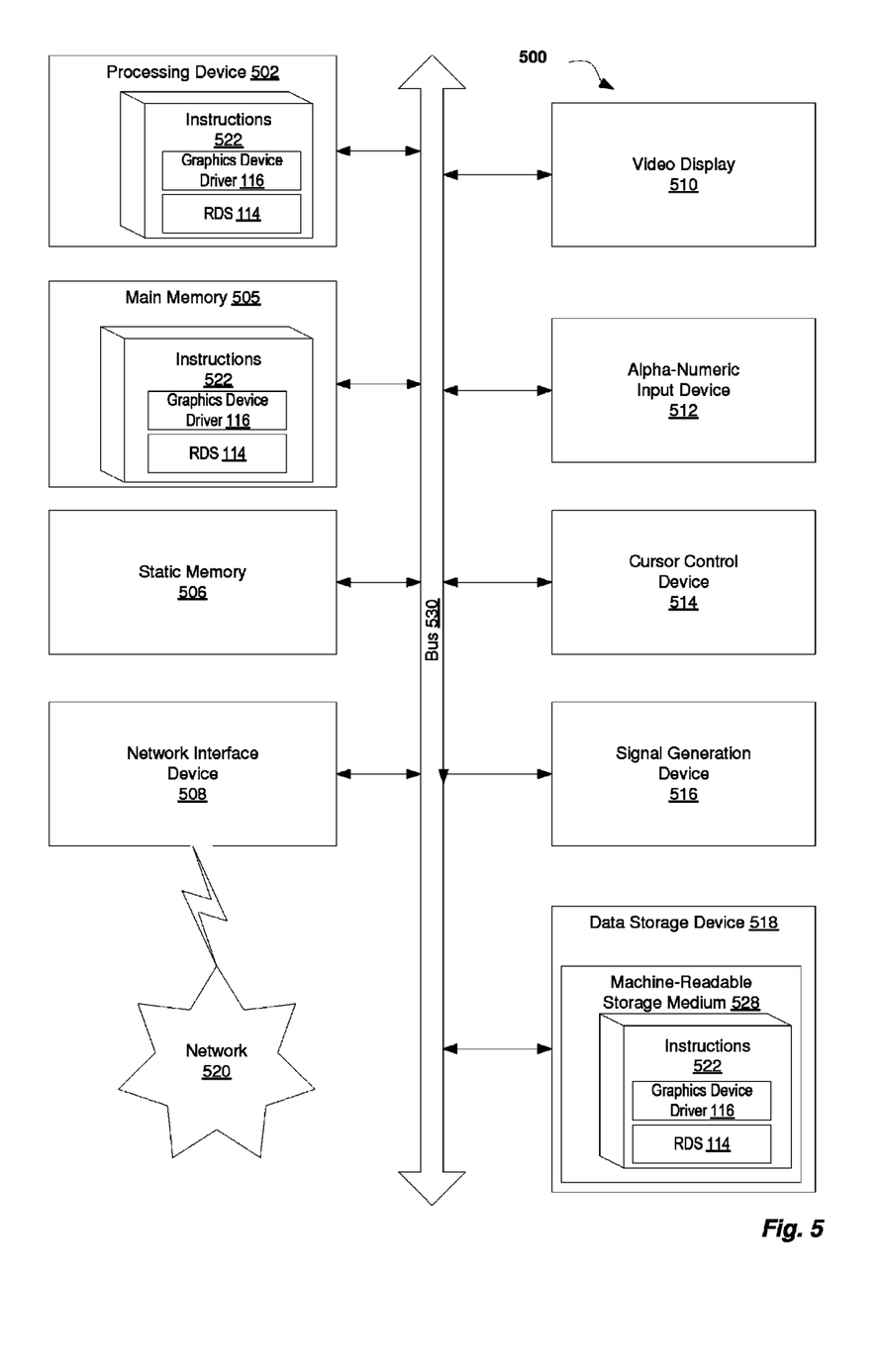
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., instructions 522) for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-readable storage media.

The machine-readable storage medium 528 may also be used to store instructions for a graphics device driver, a virtual graphics device and/or a remote display system (e.g., graphics device driver 116, virtual graphics device 124 and remote display system 114 of FIG. 1), and/or a software library containing methods that call the graphics device driver, a virtual graphics device and/or a remote display system. While the machine-readable storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims.

What is claimed is:

1. A method comprising:
   receiving, by a processor executing code for a graphics device driver, a new image object that has an identifier;

making a first determination by the processor as to whether the new image object matches one of a plurality of previously received image objects based on the identifier;

making a second determination as to whether the new image object matches one of the plurality of previously received image objects based on comparing a hash of the new image object to hashes of the plurality of previously received image objects, wherein the second determination is made responsive to no matching previously received image object being found from the first determination;

if one of the first determination or the second determination indicates that a matching previously received image object is found, sending a reference to the matching previously received image object to a client; and if neither the first determination nor the second determination indicates that a matching previously received image object is found, sending the new image object to the client.

2. The method of claim 1, wherein the new image object is a bitmap, and wherein the identifier comprises a surface identifier and an image identifier, the method further comprising:
compressing the new image object before sending it to the client.

3. The method of claim 1, further comprising:
if the second determination results in a match between the new image object and one of the plurality of previously received image objects, making a third determination as to whether image properties of the new image object match image properties of the matching previously received image object; and
determining that the matching previously received image object is not a true match if the image properties of the new image object do not match the image properties of the matching previously received image object.

4. The method of claim 1, wherein making the first determination comprises:
comparing the identifier of the new image object to one or more identifiers of the plurality of previously received image objects using a first data structure, wherein each of the plurality of previously received image objects having an entry in the first data structure, the entry comprising a previous identifier of the previously received image object and a reference to an entry in a second data structure; and
if the new image object does not match any existing entry in the first data structure, adding a new entry to the first data structure for the new image object.

5. The method of claim 4, wherein making the second determination comprises:
generating the hash of the new image object;
comparing the hash of the new image object to the hashes of the plurality of previously received image objects using the second data structure, wherein each of the plurality of previously received image objects is associated with an entry in the second data structure, the entry including the hash of the image object and a reference to a location in a cache where the previously received image object is stored; and
if the new image object does not match any existing entry in the second data structure, adding a new entry to the second data structure for the new image object and giving the new entry a reference count.

6. The method of claim 5, wherein generating the hash of the new image object comprises:

computing an initialization value based on properties of the new image object; and
using the initialization value in a hash function to generate the hash of the new image object.

7. The method of claim 5, wherein the new image object is not cached when the new entry is added to the second data structure.

8. The method of claim 7, further comprising:
receiving an additional image object;
determining that the additional image object matches the new image object;
incrementing the reference count for the new image object in the second data structure; and
if the reference count satisfies a reference count threshold, caching the additional image object to the new location in the cache.

9. A non-transitory computer readable storage medium including instructions that, when executed by a processor, cause the processor to perform operations comprising:
receiving, by the processor executing code for a graphics device driver, a new image object that has an identifier;
making a first determination by the processor as to whether the new image object matches one of a plurality of previously received image objects based on the identifier;
making a second determination as to whether the new image object matches one of the plurality of previously received image objects based on comparing a hash of the new image object to hashes of the plurality of previously received image objects, wherein the second determination is made responsive to no matching previously received image object being found from the first determination;
if one of the first determination or the second determination indicates that a matching previously received image object is found, sending a reference to the matching previously received image object to a client; and
if neither the first determination nor the second determination indicates that a matching previously received image object is found, sending the new image object to the client.

10. The non-transitory computer readable storage medium of claim 9, wherein the new image object is a bitmap, and wherein the identifier comprises a surface identifier and an image identifier, the operations further comprising:
compressing the new image object before sending it to the client.

11. The non-transitory computer readable storage medium of claim 9, the operations further comprising:
if the second determination results in a match between the new image object and one of the plurality of previously received image objects, making a third determination as to whether image properties of the new image object match image properties of the matching previously received image object; and
determining that the matching previously received image object is not a true match if the image properties of the new image object do not match the image properties of the matching previously received image object.

12. The non-transitory computer readable storage medium of claim 9, wherein making the first determination comprises:
comparing the identifier of the new image object to one or more identifiers of the plurality of previously received image objects using a first data structure, wherein each of the plurality of previously received image objects having an entry in the first data structure, the entry comprising a previous identifier of the previously received image object and a reference to an entry in a second data structure; and if the new image object does not match any existing entry in the first data structure, adding a new entry to the first data structure for the new image object.

13. The non-transitory computer readable storage medium of claim 12, wherein making the second determination comprises:

generating the hash of the new image object;

comparing the hash of the new image object to the hashes of the plurality of previously received image objects using the second data structure, wherein each of the plurality of previously received image objects is associated with an entry in the second data structure, the entry including the hash of the image object and a reference to a location in a cache where the previously received image object is stored; and if the new image object does not match any existing entry in the second data structure, adding a new entry to the second data structure for the new image object and giving the new entry a reference count.

14. The non-transitory computer readable storage medium of claim 13, wherein the new image object is not cached when the new entry is added to the second data structure.

15. The non-transitory computer readable storage medium of claim 14, the operations further comprising:

receiving an additional image object;

determining that the additional image object matches the new image object;

incrementing the reference count for the new image object in the second data structure; and if the reference count satisfies a reference count threshold, caching the additional image object to the new location in the cache.

16. The non-transitory computer readable storage medium of claim 14, wherein generating the hash of the new image object comprises:

computing an initialization value based on properties of the new image object; and using the initialization value in a hash function to generate the hash of the new image object.

17. An apparatus comprising:

a memory having stored thereon instructions for determining image uniqueness; and a processor, connected with the memory, to execute the instructions, wherein the instructions cause the processor to:

receive a new image object that has an identifier;

make a first determination as to whether the new image object matches one of a plurality of previously received image objects based on the identifier;

make a second determination as to whether the new image object matches one of the plurality of previously received image objects based on comparing a hash of the new image object to hashes of the plurality of previously received image objects, wherein the second determination is made responsive to no matching previously received image object being found from the first determination;

if one of the first determination or the second determination indicates that a matching previously received image object is found, send a reference to the matching previously received image object to a client; and if neither the first determination nor the second determination indicates that a matching previously received image object is found, send the new image object to the client.

18. The apparatus of claim 17, wherein the instructions further cause the processor to:

compare the identifier of the new image object to one or more identifiers of the plurality of previously received image objects using a first data structure, wherein each of the plurality of previously received image objects having an entry in the first data structure, the entry comprising a previous identifier of the previously received image object and a reference to an entry in a second data structure; and if the new image object does not match any existing entry in the first data structure, add a new entry to the first data structure for the new image object.

19. The apparatus of claim 18, wherein the instructions further cause the processor to:

generate the hash of the new image object;

compare the hash of the new image object to the hashes of the plurality of previously received image objects using the second data structure, wherein each of the plurality of previously received image objects is associated with an entry in the second data structure, the entry including the hash of the image object and a reference to a location in a cache where the previously received image object is stored; and if the new image object does not match any existing entry in the second data structure, add a new entry to the second data structure for the new image object and giving the new entry a reference count.

20. The apparatus of claim 19, wherein the new image object is not cached when the new entry is added to the second data structure, the instructions further to cause the processor to:

receive an additional image object;

determine that the additional image object matches the new image object;

increment the reference count for the new image object in the second data structure; and if the reference count satisfies a reference count threshold, cache the additional image object to the new location in the cache.

21. The apparatus of claim 19, wherein generating the hash of the new image object comprises:

computing an initialization value based on properties of the new image object; and using the initialization value in a hash function to generate the hash of the new image object.

* * * * *